United States Patent Office 2,933,367
Patented Apr. 19, 1960

2,933,367

FLAME-RESISTANT CELLULOSIC TEXTILES AND PROCESS OF REACTING CELLULOSE ETHER TEXTILES WITH AZIRIDINYL PHOSPHINE OXIDE OR SULFIDE

Wilson A. Reeves and George L. Drake, Jr., Metairie, and John D. Guthrie, New Orleans, La., assignors to the United States of America as represented by the Secretary of Agriculture No Drawing. Application October 29, 1957
Serial No. 693,210

3 Claims. (Cl. 8—129)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new flame-resistant, textiles and processes for their production. These new materials are especially suitable for use in clothing, tents, paulins, awnings, drapery, cardtable covers and the like uses.

In general this invention relates to flame-resistant textiles capable of being produced by the reaction of compounds which contain two or more 1-aziridinyl groups

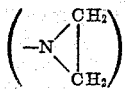

attached directly to phosphorus atoms with chemically modified cellulose which contain a plurality of inorganic acid groups.

It is an objective of the present invention to prepare a new group of flame-resistant cellulosic textiles which have particular utility in garments for civilian and military purposes, for use in tents, awnings and in general wherever flame-resistant textiles are needed. Flame-resistant fabrics with a permanent stiff finish when dry, can be obtained by reacting a chemically modified cellulose, containing sufficient inorganic acid groups to cause the textile to become slightly gelatinous, with a compound which contains two or more 1-aziridinyl groups attached directly to pentavalent phosphorus atoms. A particular feature of this new group of flame-resistant textiles is that it constitutes a chemical modification of cellulose. Another feature of this new group of flame-resistant textiles is that they can undergo the calendering, embossing and other similar processes. Other objectives of the invention will be apparent to those skilled in the art as the description of the invention proceeds.

Such flame-resistant materials contain the characteristic reoccurring structure

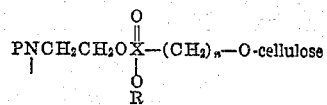

wherein X is a member of the group consisting of sulfur and phosphorus, $n$ is 0, 1, 2, or 3 and R is a member of the group consisting of hydrogen and a

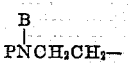

group, where B is either hydrogen or another

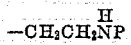

group.

Such modifications of cellulose are insoluble in water or other solvents. The modified celluloses contain nitrogen and phosphorus and are flame-resistant. The flame-resistance is durable to leaching and to laundering.

1-aziridinyl compounds suitable for use in this invention are compounds that contain the following structure:

where Z is oxygen or sulfur; A is

Y is

a dialkyl amine, an alkyl, an alkylene or an aryl group. Some typical examples of compounds are:

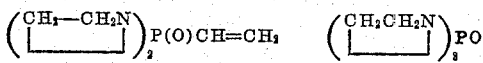

and

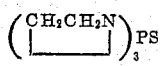

These 1-aziridinyl compounds can be prepared by substantially any of the known processes for producing such compounds. In general, they are prepared by reacting ethylenimine with the corresponding non-metallic halide in the presence of an acid acceptor such as triethanolamine.

Chemically modified celluloses suitable for use in this invention include substantially any derivative of cellulose that contains a plurality of inorganic acid groups. The amount of inorganic acid groups or the degree of substitution may range from about one inorganic acid group per thirty anhydroglucose units up to about one acid group per five anhydroglucose units. The cellulose derivatives containing free inorganic acid groups with the higher degree of substitution are soluble in water and dilute alkali. The inorganic acid groups are attached to the anhydroglucose units and contain the structure

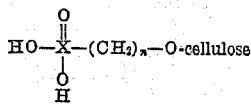

wherein X is phosphorus or selectively

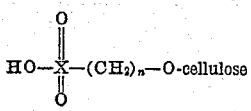

wherein X is sulfur, and $n$ is 0, 1, 2, or 3. Some specific chemicaly modified celluloses that can be used in practicing the present invention are given below:

- Phosphonomethyl cellulose
  Cellulose-O—$CH_2CH_2S(O)_2(OH)$
- Sulfoethyl cellulose
  Cellulose-O—$CH_2CH_2S(O)(OH)_2$
- Cellulose phosphate
  Cellulose-OP(O)$(OH)_2$
- Cellulose sulfate
  Cellulose-OS(O)$_2$(OH)

The invention is not limited to the use of only these cellulosic derivatives. The cellulosic derivative may contain other groups for example one of the acidic H of the OH groups may be replaced by an alkyl or aryl group.

The proportions of reactants can be varied widely depending, for example, upon the particular properties desired in the final product. Considerably more of the 1-aziridinyl compound than the stoichiometrical amount for reacting with the acidic groups can be chemically bound to the modified cellulose since an acidic group not only reacts with a 1-aziridinyl group but in doing so produces another group

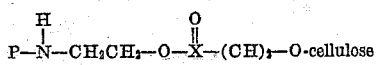

containing a hydrogen atom attached to trivalent nitrogen that may react with an additional 1-aziridinyl ring to produce a stable link containing the structure:

1-aziridinyl compounds react with the acid groups almost quantitatively when they are used in quantities not to exceed about one aziridinyl group per acid group. The properties of the chemically modified cellulose containing one inorganic acid group per thirty anhydroglucose units may be markedly changed by reacting as little as 2% tris(1-aziridinyl)phosphine sulfide with it.

In practicing this invention the reaction of the 1-aziridinyl compound with the chemically modified cellulose can be carried out at widely varied temperatures; the reaction proceeds slowly at 20° C. but very rapidly at 140° C. When the modified cellulose is in the form of a textile, the reaction can be carried out by two methods conventionally used for finishing textiles. For example, the textile can be padded in solution of the 1-aziridinyl compound and then dried in an oven or ironed dry, or the textile can be agitated in the solution at a convenient temperature until the reaction has proceeded to the desired extent. If the cellulose is a highly substituted cellulose derivative, it may be soluble in water. In this case, it is necessary to carry out the reaction in aqueous-ethanol solution or in other solutions which dissolve the 1-aziridinyl compound and which do not dissolve the modified cellulose. Suitable solvents include acetone, ethanol and benzene. Although ethanol and other alcohols react with both the 1-aziridinyl compounds and with acids, the reaction of 1-aziridinyl compounds with inorganic acid groups attached to cellulose is much faster at a given temperature, therefore, the reaction may be carried out in alcoholic solvents with only slight modification of the final product. For best results, the cellulosic material should be in the free acid form and not as the metal salt. When in the form of the metal salt, it can be converted to free acid form by first rinsing or soaking in a dilute (3–5%) mineral acid and then rinsing with water.

The following examples are given by way of illustration and not by way of limitation of this invention. All parts and percentages are by weight. For convenience the compound, tris(1-aziridinyl)phosphine sulfide and tris(1-aziridinyl)phosphine oxide are referred to as APS and APO respectively.

In the examples, the flame resistance of various resin impregnated cloths were compared by the "strip flame test" method. In this method a strip of the cloth, which is about half an inch wide and about 4 inches long, is supported at one end so that the strip extends toward some degree between 0 and 180 relative to a vertical azimuth. The unsupported ends of the cloth strips are ignited by contacting them with a flame until the cloth begins to burn. As soon as the cloth is ignited the flame used to ignite it is removed. The flammabilities of the cloths are compared on the basis that when so supported and ignited the cloths have a much greater tendency to burn when they extend straight down and are ignited at the bottom. Untreated cellulosic cloth will fail at 0 degree (i.e. will burn when supported to extend straight up and ignited at the top). A very flame resistant cloth will pass at 180° (i.e. will not burn even when supported to extend straight down and ignited at the bottom). And, a relatively flame resistant cloth will not fail except at some degree between about 90 and 180 (i.e. when supported to extend at least somewhat downwardly so that the flame is propagated at least somewhat upwardly).

*Example 1*

Phosphonomethylated cotton sheeting (prepared according to our copending application Serial No. 693,787, filed October 31, 1957, by reacting chloromethyl phosphonic acid with cotton in the presence of a strong base) was regenerated (put into the free acid form) by soaking in 3% hydrochloric acid for one hour, then rinsing in distilled water to free the fabric of hydrochloric acid, and then air dried. Four samples of the fabric containing .05% phosphorus were padded through a 5% solution of APO. Four samples containing 0.14% were padded through 10% APO. All eight of the samples were cured for five minutes. The samples which were cured by heat were heated in a forced-draft oven. One sample of each set (one containing .05% phosphorus and one 0.14% phosphorus) were cured as follows: (1) room temperature; (2) 50° C.; (3) 90° C.; and (4) 130° C. After heating (curing) the samples were washed in water and dried. All of the fabrics contained phosphorus and nitrogen and had a slight degree of flame resistance which was not destroyed by soaking in dilute sodium carbonate solution.

*Example 2*

Phosphonomethylated cotton sheeting (48 x 48) containing 0.44% phosphorus was regenerated and treated with APO as described in Example 1. In this case the phosphonomethylated cotton contained 0.44% phosphorus. The conditions of treatment and degree of flame resistance are shown in the following table.

REACTION OF PHOSPHONOMETHYL CELLULOSE CONTAINING 0.44% PHOSPHORUS WITH APO

| Sample Number | Reaction Temperature | Concentration of APO Used, percent | Percent Weight Gain | Flame Resistance Angle, degrees |
|---|---|---|---|---|
| 1 | Room Temp. (26° C.) | 5 | 2.1 | 145 |
| 2 | 50° C. | 5 | 1.3 | 80 |
| 3 | 90° C. | 5 | 2.6 | 100 |
| 4 | 130° C. | 5 | 3.1 | 145 |
| 5 | Room Temp. (26° C.) | 10 | 4.5 | 110 |
| 6 | 50° C. | 10 | 1.8 | 90 |
| 7 | 90° C. | 10 | 3.2 | 110 |
| 8 | 130° C. | 10 | 6.0 | 170 |

*Example 3*

Phosphonomethylated 48 x 48 cotton sheeting containing 0.75% phosphorus was treated as per Example 1. Results are shown in the following table.

REACTION OF PHOSPHONOMETHYLATED COTTON SHEETING CONTAINING 0.75% PHOSPHORUS WITH APO

| Sample Number | Reaction Temperature | Concentration of APO Used, percent | Percent Weight Gain | Burn Angle Test, degrees |
|---|---|---|---|---|
| 1 | Room Temp. (26° C.) | 5 | 4.3 | 150 |
| 2 | 50° C. | 5 | 2.3 | 125 |
| 3 | 90° C. | 5 | 2.9 | 170 |
| 4 | 130° C. | 5 | 4.2 | 160 |
| 5 | Room Temp. (26° C.) | 10 | 7.4 | 170 |
| 6 | 50° C. | 10 | 2.7 | 150 |
| 7 | 90° C. | 10 | 4.0 | 150 |
| 8 | 130° C. | 10 | 6.8 | 150 |

Example 4

Phosphonomethylated 48 x 48 cotton sheeting containing 0.9% phosphorus was treated with APO as per Example 1. Results are shown in the following table.

REACTION OF PHOSPHONOMETHYLATED COTTON SHEETING CONTAINING 0.9% PHOSPHORUS WITH APO

| Sample Number | Reaction Time | Reaction Temperature | Concentration of APO used, percent | Percent Weight Gain | Burn Angle Test, degrees |
|---|---|---|---|---|---|
| 1 | 17 hrs | Room Temp. (26° C.) | 5 | | 170-180 |
| 2 | 5 min | 50° C | 5 | | 145 |
| 3 | 5 min | 90° C | 5 | | 150 |
| 4 | 5 min | 130° C | 5 | | 170 |
| 5 | 17 hrs | Room Temp. (26° C.) | 10 | | 180 |
| 6 | 5 min | 50° C | 10 | | 145 |
| 7 | 5 min | 90° C | 10 | | 170 |
| 8 | 5 min | 130° C | 10 | | 170 |

Example 5

Phosphonomethylated 48 x 48 cotton sheeting containing 0.9% phosphorus regenerated as in Example 1, was padded through a 10% aqueous solution of APO using 2 dips and 2 nips with a heavy squeeze roll pressure. The fabric was folded and pressed for 1 minute with a hand iron at a temperature of 450° F. A crease was pressed into the fabric where it had been folded. The fabric was washed in water and drip dried. The sample retained the crease and had a crease recovery angle of 128° (71%) whereas the untreated phosphonomethylated fabric had a crease recovery angle of 104° (57%). The sample had a burn angle of 170° with a phosphorus content of 1.86. When a damp sample of the fabric was ironed dry with a hot iron, the fabric became smooth and stiff. The process could be repeated several times without adding a stiffening agent or any other agents.

Example 6

Phosphonomethylated 48 x 48 cotton sheeting containing 0.9% phosphorus was regenerated as per Example 1 and padded in 10% APO as per Example 5. The sample was cured for 5 minutes at 90° C. in a forced draft oven, washed in water and dried. The Elmendorf tear test was 3.2 lbs. as compared to 4.0 lbs. for the untreated sample. A sample of this fabric was washed in 1% $Na_2CO_3$ solution and the flame retardancy measured. The burn angle before the wash was 90° and after the wash remained at 90°.

Example 7

Phosphonomethylated cotton sheeting containing 0.9% phosphorus and in the sodium salt form (was not regenerated as in the above examples) was treated with a 10% aqueous solution of APO as per Example 1. The burn angle was 90° with a percent phosphorus of 1.18 and percent nitrogen of 0.52.

Example 8

Phosphonomethylated cotton sheeting containing 1.57% phosphorus was processed through a 5% aqueous solution of APO as per Example 1 and cured for 5 minutes at 90° C. in a forced draft oven, washed and dried. The burn angle was 160°. A sample of this was soaked in a $Na_2CO_3$ solution overnight, washed and dried. The flame angle was 140°.

Example 9

A sample of 8.5 oz. olive drab cotton sateen was padded through a solution composed of 25% NaOH, 15%

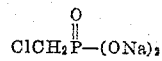

$$ClCH_2\overset{\overset{O}{\|}}{P}-(ONa)_2$$

and 60% water using 2 dips and 2 nips with a light squeeze roll pressure. The percent wet pickup was 122.4%. It was cured for 5 minutes at 140° C. in a forced draft oven, washed and dried. The percent weight increase was 7%. This phosphonomethylated 18.5 oz. olive drab sateen containing 2.0% phosphorus was regenerated as per Example 1 and then padded through a 10% aqueous APO solution as per Example 1 with a wet pickup of 98%. It was then cured for 5 minutes at 130° C. in a forced draft oven, washed and dried. The overall percent increase in weight was 16.8%. The fabric could not be ignited at the 180° angle and would only char. There was no afterglow and the fabric had a phosphorus content of 2.68% and nitrogen content of 1.67%. The Elmendorf tear strength was 7.6 lbs.

Example 10

Sulfoethylated 80 x 80 cotton print cloth, prepared by reacting chloroethyl sulfonic acid with the print cloth in an alkali solution, containing 1.7% sulfur and with an ion exchange capacity of 684 meq./kg. was regenerated as per Example 1 and padded through a 10% aqueous solution of APO as per Example 1.

A wet pickup of 95% was obtained. The fabric was divided into three pieces. One was cured in a forced draft oven for 20 minutes at 60° C., another for 2 minutes at 130° C., and the third was folded and ironed, with a hand iron at 450° F., for 1 minute. All of the samples were washed in water and drip dried. All samples would pass the 90° strip flame test. The sulfoethylated samples were gelatinous when wet but after processing with the APO were no longer gelatinous when wet. The phosphorus content was 1.08% and the nitrogen content was 1.77%. The crease recovery angle was 88 (49%) as compared to 56 (31%) for the untreated sulfoethylated fabric.

Example 11

Sulfated cotton fabric prepared by reacting pyridinium chlorosulfate with the cotton sheeting was regenerated as per Example 1 and padded through a 10% aqueous solution of APO as per Example 1. The percent wet pickup was 72%. The sample was divided into two pieces. One was cured for 2 minutes at 130° C. and the second sample was cured for 10 minutes at 60° C. in a forced draft oven. They were then washed and air dried. Both samples would pass the 90° angle flame test.

Example 12

Sulfoethylated 80 x 80 cotton print cloth containing 1.7% sulfur and with an ion exchange capacity of 684 meq./kg. was processed as per Example 10 except the sample was padded through a 10% solution of tris(1-aziridinyl)phosphine sulfide (APS). A wet pickup of 106% was obtained. The dry weight increase was 6.86%. The sample would pass the 160° angle in the strip flame test.

Example 13

Phosphonomethylated 48 x 48 cotton sheeting containing 0.81% phosphorus was regenerated as per Example 1. The sample was processed as per Example 12. The wet pickup was 76% with a weight increase of 9.3%. The sample would pass the 160° strip flame test. The percent phosphorus was 1.86, percent nitrogen was 1.49.

Example 14

Water soluble phosphonomethylated cotton yarn containing 2.1% phosphorus was regenerated as per Example 1 using enough alcohol (10%) in the regenerating solution to prevent the yarn from dissolving. The yarn was treated with a 10% APO solution containing approximately 10% alcohol and heated for 5 minutes at 90° C. in a forced draft oven. The yarn was washed and dried. The yarn would pass the 180° strip angle test with no afterflame or afterglow. The yarn was no longer soluble in water.

We claim:
1. Flame-resistant cellulosic textile materials composed of chemically modified cellulose in which nitrogen atoms are attached directly to pentavalent phosphorus atoms in the characteristic reoccurring structure selected from the group consisting of

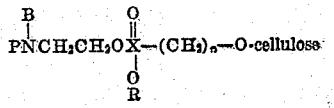

and

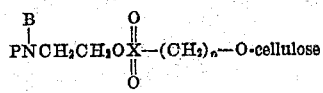

wherein X is a member of the group consisting of sulfur and phosphorus, respectively, $n$ is an integer having a value of from 0 to 3, B is a member of the group consisting of hydrogen and a

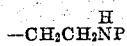

group, and R is a member of the group consisting of hydrogen and a

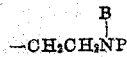

group, B being defined as above.

2. A process of producing flame-resistant chemically modified cellulosic textile materials which comprises wetting a cellulose derivative fabric, in which about from one inorganic acid group per thirty anhydroglucose units to about one inorganic acid group per five anhydroglucose units is connected to the cellulose molecule in a structure selected from the group consisting of

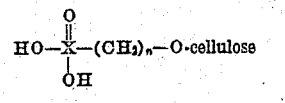

and

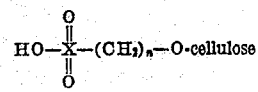

wherein X is a member of the group consisting of phosphorus and sulfur, respectively, and $n$ is an integer having a value of 0 to 3, with a solution of an aziridinyl compound selected from the group consisting of tris (1-aziridinyl) phosphine oxide, tris (1-aziridinyl) phosphine sulfide, and mixtures thereof in a solvent which is inert to the cellulose derivative and to the aziridinyl compound, and heating the wet fabric for about from 2 to 5 minutes at a temperature of about from 30° to 200° C.

3. The process of claim 2 in which the chemically modified cellulose is phosphonomethyl cellulose and the tris-(1 - aziridinyl)phosphine is tris(1 - aziridinyl)phosphine oxide.

No references cited.